July 4, 1972 J. NADRICH ET AL Re. 27,419

CLOSURE FOR A BOTTOM POUR METALLURGICAL LADLE

Original Filed April 20, 1966

INVENTORS
JOHN NADRICH
JOHN A. ERICSON
BY
Francis J. Klumpp
ATTORNEY

United States Patent Office

Re. 27,419
Reissued July 4, 1972

27,419
CLOSURE FOR A BOTTOM POUR METALLURGICAL LADLE

John Nadrich, 9756 South Ave. 44514, and John A. Ericson, 732 Market St. 44502, both of Youngstown, Ohio Original No. 3,386,633, dated June 4, 1968, Ser. No. 544,009, Apr. 20, 1966. Application for reissue June 5, 1970, Ser. No. 43,841
Int. Cl. B22d *37/00*
U.S. Cl. 222—548 10 Claims

Matter enclosed in heavy brackets [ ] appears in the original patent but forms no part of this reissue specification; matter printed in italics indicates the additions made by reissue.

ABSTRACT OF THE DISCLOSURE

A valve and nozzle assembly for a bottom pour metallurgical ladle which can be controlled from below the ladle without the use of the usual refractory shield stopper rod. The nozzle has a pair of spaced concentric annular wells in its top surface with a discharge port extending downwardly from the lower surface of the inner well. The valve element is bell-shaped with its skirt portion fitted into the inner well. The valving element is rotated by a rod extending downwardly through the nozzle on the axes of the wells and has a notch in its skirt portion which is rotated into and out of registry with the discharge port thus opening and closing the valve.

Figure 1:
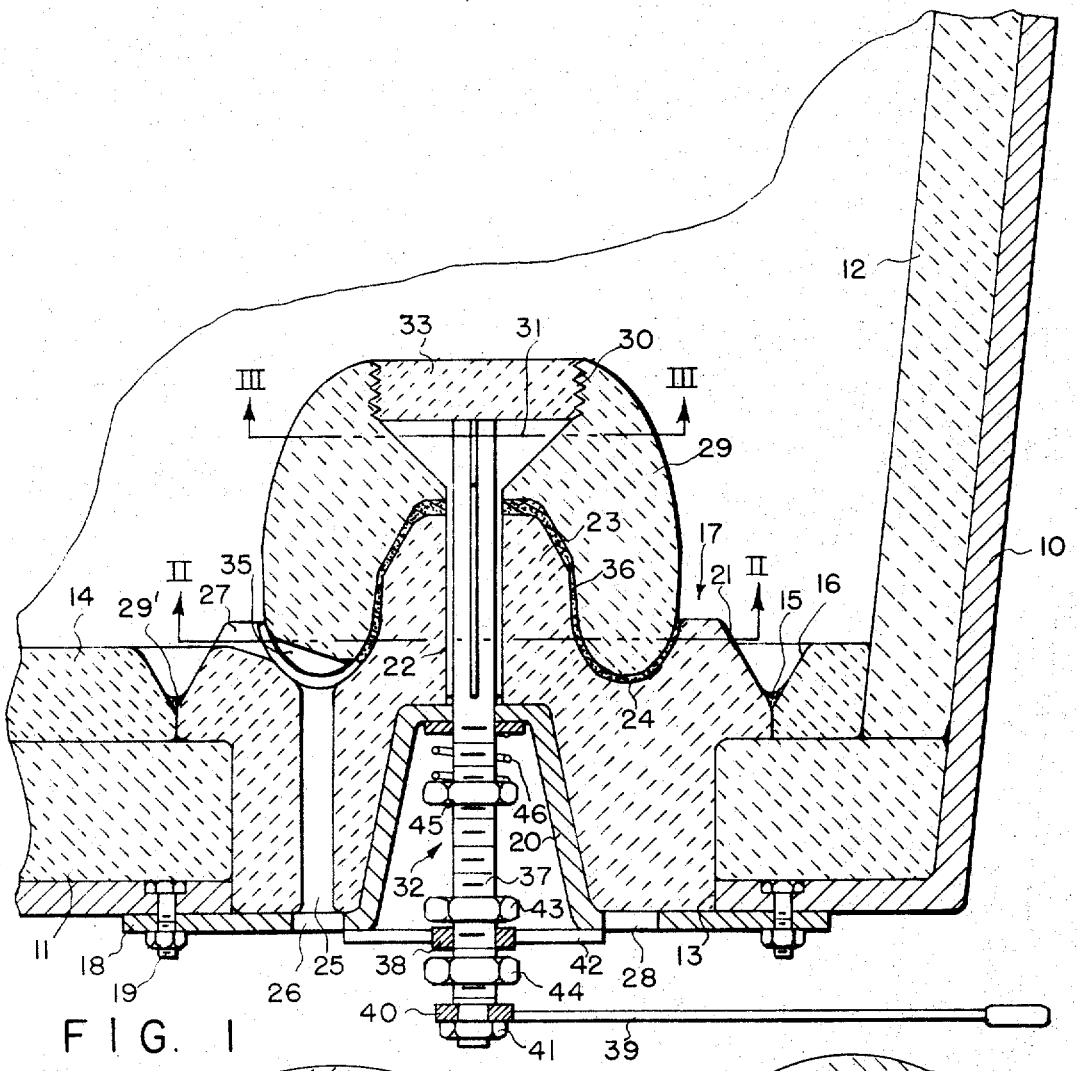

This invention relates to metallurgical apparatus and more particularly to an improved valve arrangement for controlling the discharge of molten metal through the bottom of a ladle containing the same. Accurate and reliable control of this downward discharge of molten metal is a necessity in various metallurgical practices such as the filling of ingot molds and the controlled filling of tundishes in continuous casting, for example. It is common practice to utilize movable ladles in transferring molten metal from producing and/or storage facilities to the place of utilization but severe problems now arise in connection therewith particularly due to the large tonnages of the heats handled and in some cases to the fact that the ladles are subjected to more continuous use as in connection with the new oxygen furnaces, for example.

It is necessary, on the one hand, to so construct the ladle discharge valve apparatus that the excessive application of heat does not weaken the operative elements thereof beyond their capabilities but of equal or perhaps more importance is the necessity of avoiding solidification or "freezing" of the metal between the coacting parts of the valve or in or about the interstices through which the metal flows downwardly and outwardly when the valve is opened for pouring.

It is the primary object of the present invention to provide for the practical solution of the above outlined difficulties, and the same is accomplished by the novel arrangements and features to be hereinafter more fully explained and described. The first of the more important aspects of the invention is the positioning of the valving surfaces and the inlet to the discharge bore so that the same always remain in an environment of fluid metal— not affected by the solidification of metal or the formation of skulls which invariably takes place during filling of the relatively cool ladle, during the continuous exposure of exterior surfaces of the ladle to the lower ambient temperature of the atmosphere, and during the open and closing of the discharge valve. This is accomplished by removing such surfaces and the entry portion of the discharge bore from areas or zones in which solidification or the formation of skulls is more likely to take place. In the apparatus herein disclosed we provide, in effect, an outer well and an inner well in the bottom of the ladle with the valve sealing surfaces and the fluid metal discharge point positioned in or adjacent to the inner well which consistently remains at a higher temperature than the outer well or the metal contained therein during filling, teeming, etc.

While it is desirable to control the actuation of the metal outlet valve from the bottom of the ladle the problems heretofore encountered in connection therewith have generally rendered this arrangement impractical and, consequently, the usual practice is to employ a vertically elongated and refractory protected stopper rod which extends downwardly through the pool of molten metal and is operated from above while having a lower sealing head which coacts with the inlet opening of a bore extending downwardly through a discharge nozzle cemented into the bottom wall of the ladle. However, when dealing with steels having higher fluidity or higher temperature or with large tonnage heats or in situations where the teeming or pouring periods are quite extended these elongated rods become weak and bent and the problem is aggravated by erosion of the valve sealing surfaces and in some designs by the tendency of the metal to freeze on such surfaces. The present invention, however, provides such novel improvements in the valving arrangement and in the valve actuating arrangement that bottom manipulation of the valve is made entirely practical, eliminating any need for the elongated stopper rod above described.

Another object of the invention is the provision of an improved arrangement for attaining an effective seal between the fixed and movable valving elements of the discharge nozzle, the improved seal being operative both during the filling and teeming of the ladle and during subsequent actuations of the movable element of the valve. This is accomplished, in accordance with our invention, by utilizing a novel sealing composition between the fixed and movable elements of the valve, which composition is applied in the preparation of the ladle to receive a heat of molten steel.

A further object of the invention is the provision of an improved mechanical arrangement and configuration of the essential parts of the valve having the above outlined characteristics and comprised of the fixed discharge nozzle and movable valving head whereby these components may be more easily broken out of the ladle at the end of a heat pour and replaced with new components, it being well understood by those skilled in the art that is common practice to replace these components between the pouring of successive heats.

While the present invention facilitates bottom control of the movable valving element as explained above many of the features of the invention may be advantageously used in conjunction with vertically elongated stopper rods extending down through the molten steel in the ladle if it is desired, for any reason, to control the bottom pourng from the top of the ladle. The specific aspects of this 'eature will appear below.

The above and other objects and advantages of the nvention will become apparent upon consideration of he following specification and accompanying drawing vherein there is disclosed a preferred embodiment of the nvention.

Figure 2:
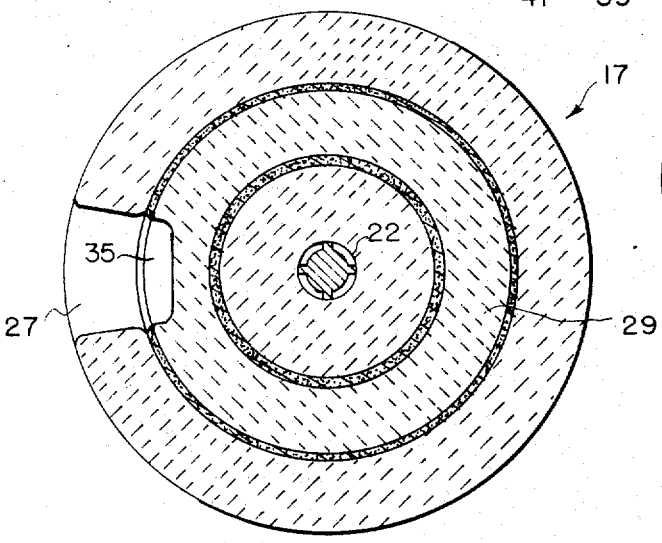
Figure 3:
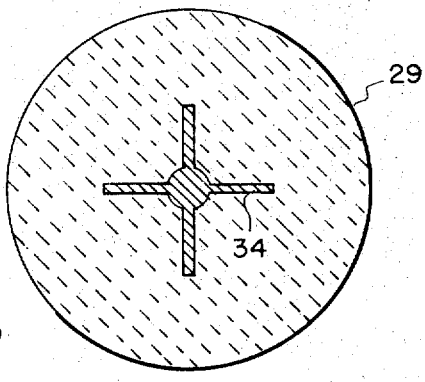

In the drawing:

FIGURE 1 is a fragmentary vertical section through he bottom portion of a ladle showing the bottom pour lischarge valve of my invention; and FIGURES 2 and 3 are horizontal sections taken along he lines II—II and III—III of FIGURE 1.

The ladle shown is, in accordance with usual practice, :omprised of an outer boilerplate cup-like shell 10 which s lined at its bottom 11 with refractory brick and along ts sides with suitable refractory brick or other material hown at 12. The bottom wall of the metal sheath 10 is argely apertured at 13, and the bottom lining 11 is also ıpertured in alignment therewith. The bottom wall is 'ormed with an inner lining 14 which may be either integral with or separate from the lining 11, depending on preference, and this interlining 14 has a large aperture 15 concentric about the aperture 13. Also, the upper edge portion of the aperture 15 is skived or coned outwardly n an upward direction as shown at 16.

Seated within the apertures 13 and 15 is a discharge nozzle structure, designated generally by reference numeral 17, and having an outwardly disposed flange which ·ests on a ledge on the upper surface of the lining 11 ·adially within the aperture 15. Nobble 17 is also supported by a metal disk 18 detachably secured to and supported by the bottom wall of the sheath 10 by the bolts 19, for example. It should be noted that the center portion of the disk 18 is deeply dished in an upward direction, as shown at 20, for a purpose to be later explained. The bottom surface of the nozzle 17 is accurately formed o fit snugly over the upward protubering portion 20 of he disk 18. The upper peripheral edge portion of nozzle 17 is coned inwardly, as shown at 21, to form with the surface 16 of the inner lining 14 a deep annular groove, he function of which will be explained in detail below. Nozzle 17 is formed with a centrally disposed thrubore 22 which is aligned with an aperture formed in the raised portion 20 of the disk 18, and immediately outward of this bore 22, in a radial direction, the nozzle 17 is formed with a dome-shaped portion 23, the lower surface of which terminates in a deep rounded annular groove 24, the radial outward edge of which is spaced inwardly from the conical surface 21, as shown in FIGURE 1. Connected to and extending vertically downward from the bottom of the groove 24 is at least one hot metal discharge bore 25 which is or are aligned with one or more apertures 26 of slightly larger diameter formed in the disk 18. Radially outward of the groove 24 at the location of each bore 25 is a trough 27 formed in the top surface of the nozzle 17, and it is preferable that the bottom of this trough as it leaves the groove between surfaces 16 and 21 be at the elevation of the upper surface of the inner lining 14.

It will be understood that in accordance with usual practice the nozzle 17 will be molded from a pliant refractory clay and then dried and fired to a hard dry mass suitable for rough handling and for being installed in the ladle preparatory to the tapping of a heat of molten metal into the ladle. At this time the stopper head or valve, to be hereinafter described, is not yet placed in position and it is a simple matter to then drop the nozzle into position against the disk 18 and into the space within the apertures of the liners 11 and 14 from which space a previously used nozzle has been ejected upwardly. To facilitate such ejection or removal of a spent nozzle the disk 18 may be provided with other apertures 28 through which heavy ejection rods may be inserted. After installation of a new nozzle, a small quantity of refractory cement

29' may be wiped into the bottom of the annular interstice between the surfaces 16 and 21 to seal the bottom of the groove formed thereby against leakage of hot molten metal.

The stopper head or movable valve member of the assembly is a mushroom-shaped body 29 preferably made of graphite to withstand the heat and forces applied to it during filling of the ladle and during subsequent opening and closing of the discharge port or parts therefrom. The head 29 has lower and inner surfaces to closely complement the shape of the groove 24 and the shape of the outer surface of the dome-shaped center portion of the nozzle 17, all as shown in FIGURE 1. Also, an enlarged threaded bore 30 is formed centrally in the upper portion of the head 29 to receive the flared head 31 of an operating stem 32, this head being well recessed in the body of the head 29 and protected by a refractory cap 33 received in the threads 30. As shown more clearly in FIGURE 3, the flared head of stem 32 comprises integral wedge-shaped vanes 34, and in the process of manufacture of the head 29 suitable deep grooves are formed in the head 29 to receive these vanes. By this arrangement, a very heavy turning force may be applied through the stem 32 to the head 29 to insure rotation of the latter even under very adverse conditions when opening and closing off the discharge port or ports 25.

To open the port or ports 25 to allow downward discharge of molten metal when the head 29 is properly aligned in angular relation to the port or ports, we provide an inclined slot 35 in the bottom edge of the head 29 at each port location. The slot or slots 35 are then coincident with the trough of troughs 27 and a passage or passages is thus established leading from the space within the ladle to the discharge port or ports 25. It will be obvious from FIGURE 1 that upon rotation of the head 29 from the position shown in FIGURE 1 continuous portions of the rounded depending bottom end of the head 29 will bridge the outlet or outlets of the trough or troughs 27 and thereby seal off the ports from the space within the ladle.

Interposed between the surfaces 23 and 24 of the nozzle structure 17 and the lower interior surfaces of the head 29 is a layer of cementitious material 36 which is applied during the assembly of the head to the nozzle. The material 36 is a mixture of fine silicon sand, powdered alumina and a stony powder of sodium of potassium silicate, the latter commonly known as "water glass" and as the mixture is shipped to the user it may be either dry or wetted with water to provide a thin paste-like composition suitable for immediate use by the preparer of the ladle bottom.

In a dry state the alumina may comprise approximately 25 to 30% of the total weight of the ingredients of the composition. This composition, of course, spread onto the surfaces 23 and 24 in a uniform coating before the head 29 is fitted, and during the process thereof and shortly thereafter will tend to dry out to a solid or semi-solid state to provide adequate support for the head 29 as the heavy molten steel later is filled into the ladle. This avoids premature outward extrusion of the cementitious material 36 and insures the effective sealing of the groove 24, particularly at the outlet passages 27, 35. The composition of the material 36, however, has the advantageous characteristic of becoming semi-liquid and thus somewhat slippery after a shorten exposure to the heat of the molten metal and the absorption of heat therefrom into the interstice occupied by the material. This is due to the softening of the water glass and perhaps some melting of the silica but, in any event, the end result is to lessen the adhesion and friction between the nozzle and head, permitting the latter to readily rotate with respect to the nozzle to open and close the discharge port or ports while yet providing an effective seal when the valve is closed off.

As shown, the body portion of the stem 32 immediately below the vanes 34 are longitudinally ribbed to space this body portion slightly radially inward from the bore 22 to retard heat conduction to this body portion and thereby render it more stable and stronger over long periods as is required in the pouring of large heats into molds and the filling of tundishes in continuous casting plants. Obviously, the diameter of the bore 22 is sufficient to accommodate the rotation of the ribs on the stem 32. The stem 32 extends downwardly through an aperture in the raised portion 20 of the plate 18 and is threaded in its lower half portion as shown at 37. An expansion spring 46 adjustable by a nut 45 is provided to yieldably bias the head 29 to lower seated position whereby the valve seal is maintained against the tendency of the heavier steel to float the head 29 upwardly.

Spanning the opening to the projection 20 and rigidly connected to the plate 18 is a bar 42 having a centrally disposed and preferably thickened section 38 through which the stem 32 extends. Safety nuts 43 and 44 are threaded onto the stem 32, 37 on opposite sides of the section 38 to restrain undue raising or lowering of the head 29 in the event of any serious malfunctioning of the apparatus. Stem 32 and consequently the head 29 may be arranged to be rotated by an elongated lever 39 which is keyed onto the lower end of stem 32 as shown at 40, being held in position by a retaining nut 41. If desired, however, the valving head 29 may be rotated from above by a refractory protected stopper rod, not shown herein, which may be advantageously connected into the threaded bore 30.

Among the more important aspects of the invention is the provision of the angular well formed by the surfaces 16 and 21 outwardly of the groove 24. When hot molten metal is first poured into a relatively cool ladle it has the tendency to solidify against the outer wall and more particularly against the bottom wall of the ladle, thereby forming what is known in the art as a "skull." In the structure of the present invention, however, this tendency to freeze in a radially inward direction is stopped by the aforesaid angular well thereby retaining the fluidity of the metal in and about the groove 24 and particularly at the valving passages 27 and 35. The condition is aided by the proximity of these various surfaces and passages to the hot center core of the mass of molten metal in the ladle. Consequently, the valve remains readily operable throughout the whole of the pouring or teeming cycle and there is no tendency of the movable head 29 of the valve from becoming frozen to or sticking to the nozzle structure 17 which would obviously cause difficulty and increase the probability of malfunctioning of the operating mechanism for the valve.

Another important aspect of the invention is the integral protuberance 20 on the plate or disk 18 which is generally open to the atmosphere so that the whole of the plate or disk is kept at a safe temperature for adequate strength whereby the bulk of the stem 32 is likewise adequately cooled for adequate strength and longevity of this part. Finally, the arrangement raises the critical portions of the nozzle assembly 17 well up into the hot mass of the molten metal in the ladle to permit the proper functioning of the valve in the manner outlined above. Also, the configuration of the seal formed by the cementitious material 36 effectively resists flow or leakage of molten metal into contact with the stem 32 which would be highly deleterious to the latter as will be appreciated by those skilled in the metallurgical art. Such resistance to flow or leakage continues even after repeated opening and closing of the valve, this characteristic being aided by the lubricating nature of the material 36 as explained above.

Having thus described our invention what we claim is:

1. In a bottom pour meltallurgical ladle having a refractory lined bottom wall and means in the bottom wall providing a downwardly opening discharge port, the improvement comprising: an annular well in said bottom wall adjacent to and communicating with said discharge port; an annular valving element for opening and closing said port, the lower surface of said valving element being complementary to said annular well and received therein; means to move said valving element effecting the opening and closing of said port *while maintaining said lower surface of said valving element in contact with said well*; and a second annular well in said bottom wall spaced radially outward from said valving element and said first mentioned annular well.

2. Apparatus according to claim 1 further characterized in that said valving element is provided with a notch in its side portion which may be brought into and out of registry with said discharge port by movement of said valving element in said first mentioned annular well.

3. Structure according to claim 1 further characterized in that said first mentioned annular well and said discharge port are incorporated in a nozzle member which is separate and removable from a general bottom lining of the ladle.

4. Structure according to claim 3 further characterized in that said valving element has a dependent, thickened and rounded skirt portion which has close fitting interengagement with said first mentioned well, the material of said nozzle member being domed upwardly radially within said first mentioned annular well and said valving element being recessed upwardly radially inward of said skirt to complement the upwardly projecting domed portion of said nozzle member.

5. Apparatus according to claim 3 further characterized in that said valving element is rotatable with respect to said nozzle member about the center axis of said first mentioned well and in that said port comprises an opening through said nozzle member depending from said first mentioned well while the said means to open and close said port comprises a notch in said skirt adapted to be brought into registry with a notch in said nozzle member extending radially outward from said first mentioned well.

6. Apparatus according to claim 3 further characterized in that said first mentioned annular well and said discharge port are incorporated in a nozzle member which is separable and removable from a general bottom lining of the ladle; said general bottom lining being apertured to snugly receive said nozzle member; and the upper portion of the peripheral edge of said nozzle member and the upper portion of the inner annular wall of said aperture being both skived to form said second mentioned annular well.

7. Apparatus according to claim 3 further characterized in that said nozzle member is comprised of a block of refractory material having a centrally disposed and upwardly extending deep recess in its bottom wall; the ladle being provided with a member detachably secured to the outer shell of the ladle for supporting said nozzle member; said member having a configuration complementary to the bottom wall of said nozzle member.

8. Apparatus according to claim 4 further including a cementitious layer between said first mentioned well and the lower portion of said skirt fitting in said well, said cementitious material comprising a mixture of clay and a silicate which softens upon the continued application of high temperature to thereby lubricate the relative movement of the valving element and the nozzle member while maintaining an effective seal against the leakage of molten metal through said port whenever the valving element is moved to closed position.

9. Apparatus according to claim 5 further including a rotatable operating stem secured to said valving element and extending downwardly through a bore in said nozzle member, and means secured to the lower end of said stem to rotate said stem and consequently said valving element.

10. Apparatus according to claim 9 further characterized in that said stem has a portion receivable in said bore which is provided with longitudinally extending ribs whereby the principal body portion of said stem is spaced from the side wall of the bore to insulate said principal body portion from the heat of said nozzle member.

References Cited

The following references, cited by the Examiner, are of record in the patented file of this patent or the original patent.

UNITED STATES PATENTS

| | | | |
|---|---|---|---|
| 1,338,001 | 4/1920 | Cordes | 251—144 X |
| 1,447,021 | 2/1923 | Hamer | 251—144 X |
| 1,492,883 | 5/1924 | Kidder | 251—144 X |
| 1,584,548 | 5/1926 | Karpe | 251—310 |
| 1,732,126 | 10/1929 | Gardner | 251—144 X |
| 2,711,846 | 6/1955 | Berchall et al. | 251—310 X |
| 2,286,793 | 3/1958 | Flichinger et al. | 222—566 |

| | | | |
|---|---|---|---|
| 2,961,722 | 11/1960 | Lilljekvist et al. | 222—567 |
| 3,124,854 | 3/1964 | Dore | 222—1 |
| 3,200,457 | 8/1965 | Wagstaff | 222—1 |
| 3,204,836 | 9/1965 | Jaffe | 222—548 |
| 1,585,002 | 5/1926 | Williams | 222—DIG 3 |
| 460,575 | 10/1891 | Grace | 222—DIG 6 |
| 2,863,189 | 12/1958 | Beck | 222—DIG 6 |

FOREIGN PATENTS

| | | | |
|---|---|---|---|
| 539,501 | 11/1931 | Germany | 222—559 |

ROBERT B. REEVES, Primary Examiner

D. A. SCHERBEL, Assistant Examiner

U.S. Cl. X.R.

222—511, 567;251— 144